(12) United States Patent
Iotti

(10) Patent No.: US 9,394,667 B2
(45) Date of Patent: Jul. 19, 2016

(54) STABILIZATION APPARATUS

(71) Applicant: MANITOU ITALIA S.R.L., Castelfranco Emilia (IT)

(72) Inventor: Marco Iotti, Reggio Emilia (IT)

(73) Assignee: MANITOU ITALIA S.R.L., Castelfranco Emilia (IT)

( * ) Notice: Subject to any disclaimer, the term of this patent is extended or adjusted under 35 U.S.C. 154(b) by 0 days.

(21) Appl. No.: 14/808,839

(22) Filed: Jul. 24, 2015

(65) Prior Publication Data
US 2016/0024751 A1 Jan. 28, 2016

(30) Foreign Application Priority Data
Jul. 28, 2014 (IT) .............................. MO2014A0212

(51) Int. Cl.
*B60S 9/02* (2006.01)
*E02F 9/08* (2006.01)
*B66C 23/78* (2006.01)
*B66C 23/80* (2006.01)

(52) U.S. Cl.
CPC . *E02F 9/085* (2013.01); *B60S 9/02* (2013.01); *B66C 23/78* (2013.01); *B66C 23/80* (2013.01)

(58) Field of Classification Search
CPC .............. E02F 9/085; E02F 9/00; E02F 9/02; E02F 9/04; E02F 9/10; E02F 9/14; E02F 9/18; E02F 9/20; E02F 9/22; B60S 9/00; B60S 9/02; B60S 9/04; B60S 9/10; B60S 9/14; B60S 9/18; B60S 9/20; B60S 9/22; B66C 23/78; B66C 23/80
USPC ....................... 280/763.1, 764.1, 765.1, 766.1
See application file for complete search history.

(56) References Cited

U.S. PATENT DOCUMENTS

| | | | | |
|---|---|---|---|---|
| 3,337,063 | A | * 8/1967 | Testore | ................... B66C 23/80 212/304 |
| 3,365,214 | A | * 1/1968 | Garnett | ................... B66C 23/78 212/305 |
| 3,985,036 | A | 10/1976 | Decker et al. | |
| 4,132,324 | A | * 1/1979 | Long | ....................... E02F 9/085 280/764.1 |
| 5,383,563 | A | * 1/1995 | Richtsfeld | ............... B66C 23/80 212/304 |
| 2013/0328295 | A1 | 12/2013 | Borghi | |

FOREIGN PATENT DOCUMENTS

| | | |
|---|---|---|
| FR | 2 184 554 A1 | 12/1973 |
| FR | 2 498 140 A1 | 7/1982 |
| JP | S58-122245 A | 7/1983 |
| WO | 02/49954 A1 | 6/2002 |
| WO | 2012/098447 A1 | 7/2012 |

* cited by examiner

*Primary Examiner* — John Walters
(74) *Attorney, Agent, or Firm* — Pearne & Gordon LLP

(57) ABSTRACT

A stabilization apparatus (1) for lifts, handlers and air platforms, comprising: a main body (2), suitable for being mounted onto a vehicle and provided with at least two side branches (21), relative to which respective first arms (11) are rotoidally coupled; and second arms (12), each of which being rotoidally coupled to a respective first arm (11), thereby defining, together with the branches (21), corresponding articulated stabilizers (10). The stabilizers (10) are movable between a retracted position in which they are folded onto themselves, and an extended position in which they are unfolded, thus defining a configuration of stabilization.

14 Claims, 2 Drawing Sheets

STABILIZATION APPARATUS

The present invention relates to stabilizers for lifts or handlers or air platforms of the telescopic type and, particularly, of the rotary type. Telescopic handlers or lifts are known which consist of a vehicle provided with a frame which is movable on tracks or wheels, also suitable for "off-road" vehicles, comprising a frame-mounted platform, whereon the driver's cab is in turn fitted and a telescopically extendable maneuvering arm.

At the distal end of the arm, there is provided an equipment or "accessory", such as for example a fork, a basket, a bucket, a side-shifter, a capstan, and the like, destined for lifting or moving loads.

Oftentimes, the arm comprises a quick coupling member at the distal end thereof, which enables hooking of several equipment of the type mentioned above and replacement thereof if need be.

For the sake of brevity, this kind of apparatus shall be generically termed as "handler", regardless of the equipment installed thereon.

In order for the loads to be lifted and moved at great heights and with a significant "working radius", the handler needs to be stabilized.

There are known several types of stabilizers (sometimes called "outriggers") mounted on the vehicle frame which are chosen according to the performance required by the apparatus and to customer requirements. One type of stabilizers used for these applications is the so called "pivoting" stabilizer, which provides using two support structures, each of which bears hinged arms supplied with supporting feet.

The arms are rotatably movable upon actuation of suitable actuators between an extended working position, wherein the respective foot interferes with the ground so as to allow lifting and stabilization of the vehicle, and a retracted resting position, wherein said feet do not interfere with the ground.

Therefore, when the stabilizer arms are in the extended position thereof, the vehicle can be stabilized and perform the most critical lifting operations mentioned above.

In detail, as widely known, in the working position, the feet come to define a supporting quadrilateral having larger sizes than the side encumbrance of the vehicle, so as to confer the necessary stability to the vehicle, whose stability is the greater, the broader is the quadrilateral surface.

It goes without saying that, under working conditions, i.e. when the handler is stabilized, there is a need to obtain a support base as wide as possible, however, the encumbrance of the apparatus during travel conditions shall be contextually contained as much as possible.

Furthermore, in the case of telescopic rotary handlers, wherein above mentioned platform is detected by a turret rotatably mounted on the vehicle, there is a further need to limit the vertical encumbrance of the stabilizers, when the latter are in the resting retracted configuration thereof.

Indeed, for an effective use of the handler in different working contexts, it is required that the stabilizers do not protrude into the working area of the turret, thus impeding rotation thereof; in this a manner use of the handler when the same is not stabilized and is resting on wheels (or tracks), is not precluded.

At the time, there are provided pivoting stabilizers which, despite allowing rotation of the turret, they offer a support base which defines a quadrilateral exhibiting a non-optimal width for some applications to which current handlers are destined for.

Conversely, there are present stabilizers on the market which are provided with a wide support base, but devised such that, when in the resting position thereof, they protrude into the turret working area, which implies in practice that the handler can work with full effectiveness only when stabilized.

Aim of the present invention is to provide improved stabilizers which are able to offer great stability and allow use of a handler of the rotary type, once they have been mounted thereon, even though the latter is not stabilized.

This aim is attained by the stabilization apparatus realized according to claim 1.

Further characteristics and advantages of the present invention will become more apparent from the indicative, and therefore non-limiting, description of a preferred but non-exclusive embodiment of a stabilization apparatus according to the invention, as illustrated in the accompanying drawings wherein.

Figure 1:
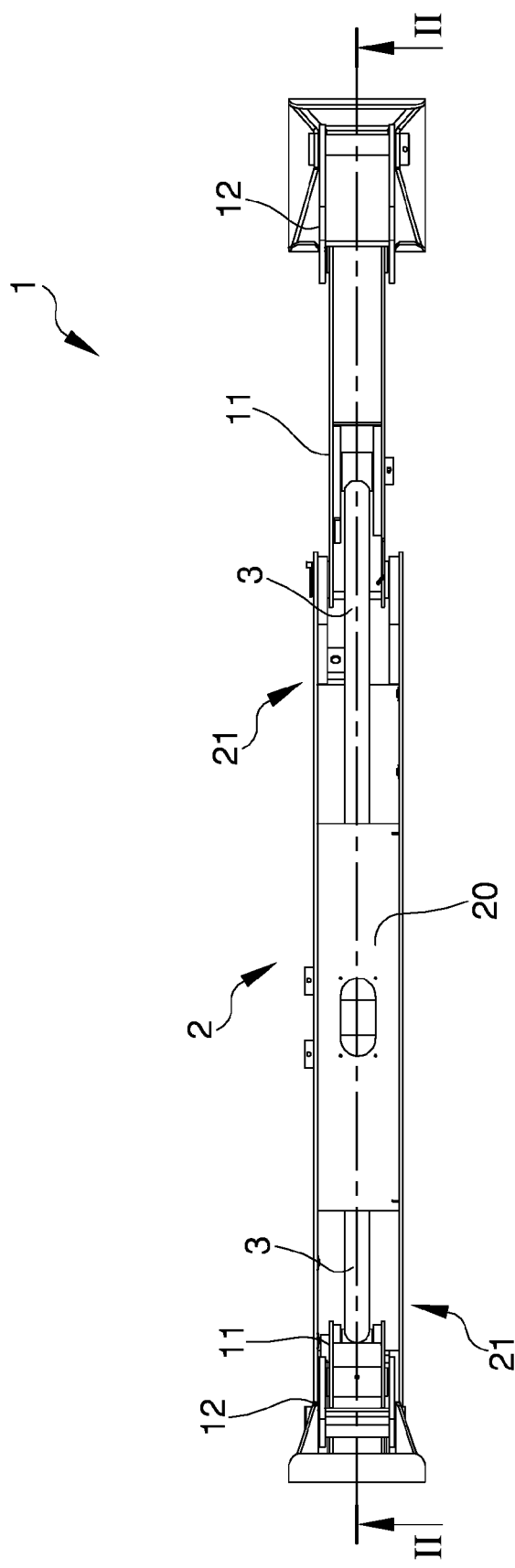
FIG. 1 is a schematic top view of the apparatus according to the invention.

With reference to the attached figures, by 1 it is generically indicated the stabilization apparatus of the invention.

The apparatus 1 herein disclosed, is destined for being mounted on board of lifts or handlers or air platforms of the telescopic type and particularly of the rotary type.

In detail, the apparatus 1 is suitable for being used in connection to any operational or rotary machines which require to be stabilized, such as those already described in the explanation on the prior art.

Thus, use thereof within the scope of truck-mounted lifting apparatuses, would not be excluded in principle, although in a non-preferential manner.

For the sake of convenience, reference will be made hereinafter to the use of the invention to stabilize telescopic rotary handlers, of the type comprising a vehicle, which, by way of example, is movable on wheels and provided with a frame, whereon a turret is rotatably mounted, housing both the driver's cabin and the telescopic arm, in a manner already explained in the description of the prior art.

In detail, the apparatus 1 herein disclosed, is especially devised for being comprised within a stabilization system which is mountable onto the vehicle frame, below the turret.

To be precise, the stabilization system mentioned, includes at least four stabilizers 10, subdivided in pairs, preferably arranged at or near the front end and the rear end of the vehicle.

In this case, the system comprises two apparatuses 1 according to the invention, one front apparatus and one rear apparatus, each of which is provided with two stabilizers 10.

In the following, neither the purpose nor the function of the stabilizers within the scope of the technical field of the invention shall be described, in that it deals with a matter known per se, but rather, object of the description will be the structure and operation of the stabilizers 10 provided in the inventive apparatus 1.

The apparatus 1 comprises at least a main body 2, suitable for being mounted onto a vehicle and provided with at least two lateral branches 21 which define inner portions of respective stabilizers 10, as it will be better explained hereinafter.

In detail, such main body 2 may include a central part 20, intended to be arranged relative to the axis of the vehicle, whereon the apparatus 1 is mounted, which central part 20 extends from opposite sides into the two aforesaid branches 21.

Said main body 2 is intended, in use, to be placed vertically, that is, to lie substantially along a vertical plane.

The main body 2 may be substantially symmetrical with respect to a vertical plane passing through aforementioned central part 20, which plane may for example be passing through the vehicle axis.

To be precise, the entire apparatus 1 proposed may be substantially symmetrical with respect to said vertical plane.

It is therefore clear that the two branches 21 are placed on opposite sides of the vehicle.

In detail, in use, the branches 21 preferably extend downwards, thereby defining an inverted V-shaped main body 2, i.e. they have a fork-like conformation.

Even more in detail, the main body 2 may have a substantially box-shaped configuration comprising two counter-facing shaped plates, and therebetween the components described below are moving.

To each branch 21, a first corresponding first arm 11 is rotoidally coupled. Preferably, the first arm 11 is hinged, via the proximal end thereof, to the distal end of the corresponding branch 21.

According to a very important aspect of the invention, the proposed apparatus 1 comprises at least two second arms 12 each of which being rotoidally coupled to a respective first arm 11, thus defining, together with said branches 21, corresponding articulated stabilizers 10.

Therefore, each stabilizer 10 of the invention, being suitable for lifting and stabilizing the vehicle, comprises a side branch 21 of the main body 2, a first arm 11 and a second arm 12, and thus provides at least two joints. Said stabilizers 10 are thus of the "compass" or "pivoting" type, whose characteristics are however distinctive from those of the prior art. Preferably, the second arm 12 is hinged at the proximal end thereof, relative to the distal end of the first arm 11.

Figure 2:
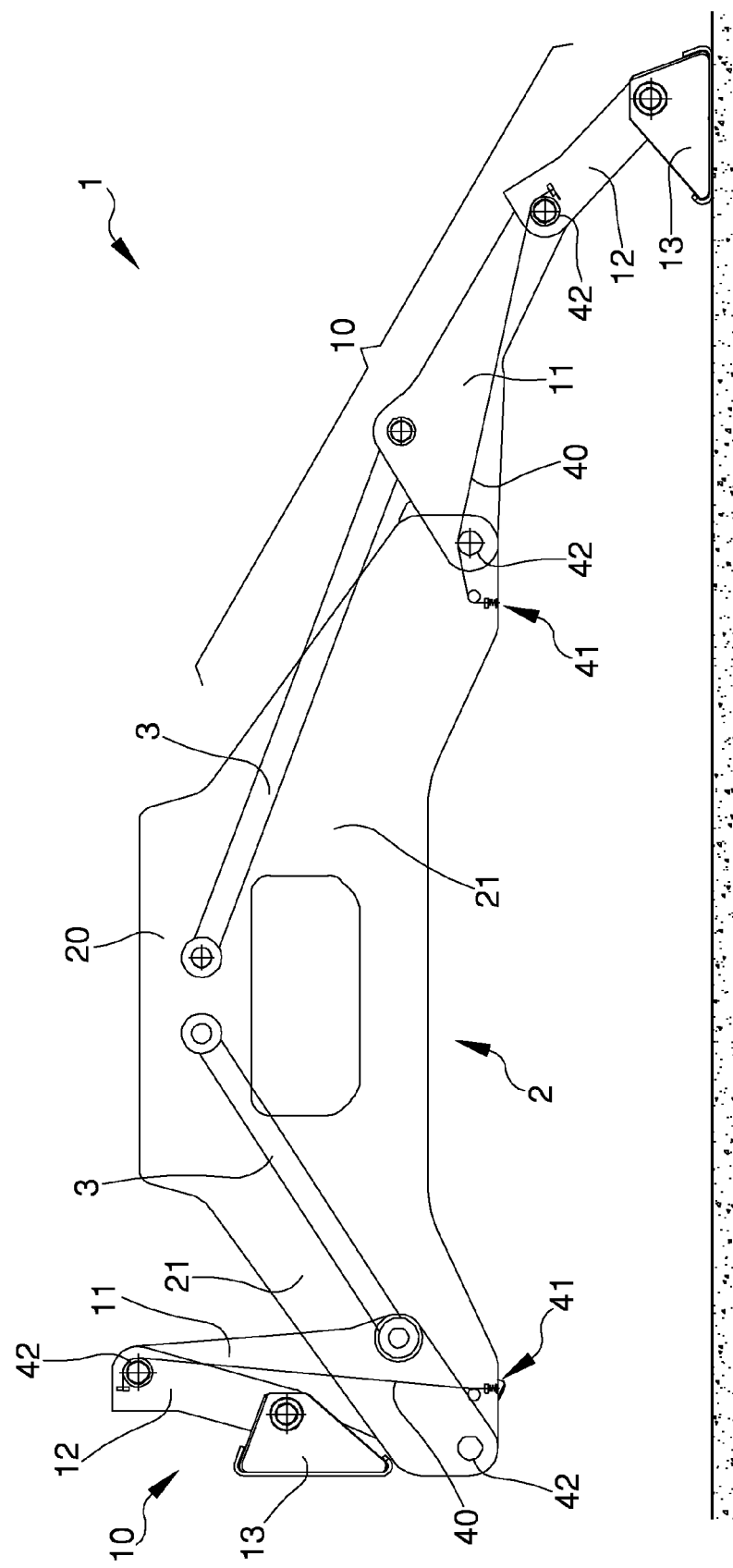
FIG. 2 is a schematic front view, of a section of the apparatus of FIG. 1, obtained along the plane II-II.

Advantageously, the stabilizers 10 of the invention are movable between a retracted or "resting", position (shown by the left stabilizer 10 of FIGS. 1 and 2), wherein they are folded onto themselves, and an extended or "in use" position, (shown by the right stabilizer of FIGS. 1 and 2), wherein they are unfolded, thus defining a configuration of stabilization.

In other words, the stabilizers 10 of the apparatus 1 herein described, are provided with at least two operational configurations, a first retracted configuration implying a minimum encumbrance, wherein no stabilizing action is performed by the stabilizers, and an extended configuration wherein said stabilizing action is instead performed by the stabilizers.

When in the stabilization configuration thereof, the stabilizers 10 protrude downwards with respect to the main body 2 and to the vehicle, and are then ready to go to strike onto the ground so as to handler and stabilize the vehicle itself.

This will be detailed further below.

In the extended position thereof, the stabilizers 10 substantially exhibit an elongated development and are oblique relative to the ground.

To each second arm 12 a support foot 13 is fastened at the distal end thereof, which support foot 13 can also be articulated, as further discussed in greater detail in a later section, the distal end being destined to the support on the ground and the thrust thereto.

The apparatus 1 further comprises actuating means 3 suitable for moving the stabilizers 10 between said retracted position and said extended position.

In detail, the proposed apparatus 1 includes a plurality of actuators 3, for example of the hydraulic type, which are able to push on command the respective stabilizers 10, so as to bring them in the extended position thereof.

Additionally, the actuators 3 are able to push the stabilizers 10 already unfolded for running an extra-stroke, thereby causing lifting of the vehicle and bearing the weight thereof during the stabilizing step.

Due to the fact that each stabilizer 10 comprises at least three sections 11, 12, 21, plus the foot 13, a telescopic handler, also comprising a stabilization system of the type described above, i.e. comprising at least a pair of stabilization apparatuses 1, will be expected to have a greater stability with respect to the prior art.

In fact, the surface of the polygon defined by the supporting points of the stabilizers 10 is greater than that which can be defined by the pivoting stabilizers 10 of the prior art.

As already explained, and how it is widely known in the industry, a greater support area allows a greater stability and thus, inter alia, a greater reach of the telescopic arm.

Advantageously, this aim is attained with a minimal encumbrance of the stabilizers 10, when brought into the rest position thereof.

To be precise, when the stabilizers 10 are in the retracted position thereof, the side encumbrance relative to the direction of travel of the vehicle does not exceed that of the known stabilizers 10, and the vertical encumbrance is so reduced as to ensure that said stabilizers do not interfere with the working area of the turret, thus allowing the driver to fully use the handler even when the latter is not stabilized, given that the turret rotation is not hindered.

In fact, as clearly visible in the attached figures showing the preferred embodiment of the invention, in the retracted position of each stabilizer 10, the corresponding first and second arms 11, 12 are arranged above the branch 21 of the main body 2 and adjacent one to another, thereby defining together a vertical encumbrance which is substantially determined by the length of the first arm 11.

More specifically, the main body 2 and the first and second arms 11, 12 may be sized such that the vertical encumbrance of the apparatus 1 in its entirety, is equal to that of the folded stabilizer 10 alone, when in the retracted configuration thereof, where the side encumbrance of the apparatus 1 is substantially equal to that of the main body 2.

In practice, when in such retracted position, the first arm 11 is arranged substantially vertical, whilst the second arm 12, which preferably has a length less than that of the former, is positioned at least partly superimposed on the first one.

In detail, in an optional and not mandatory constructive embodiment, the first arm 11 includes a pair of shaped plates, as well as the second arm 12 comprises two shaped plates opposite to one another, which can receive the first arm 11 partly.

In this configuration, the above foot 13 is arranged between the distal end of the second arm 12, which is facing downwards, and the side branch 21 of the main body 2; hereinafter there are described advantageous conformational features of foot 13.

To be precise, in this configuration, the first arm 11 exhibits a bottom proximal end, and a top distal end, and conversely for the second arm 12. Therefore, in order to be able to extend, the first arm 11 shall have to rotate downwards and the second arm 12 upwards, about the rotoidal couplings mentioned above.

According to a very advantageous and preferred aspect of the invention, such counter-rotation of the arms of the stabilizer 10 is co-ordinated and exhibits an extension such that the stabilizer 10 itself reaches the extended position thereof before the feet 13 touch the ground.

Indeed, some of the vehicles to which the invention is destined, are designed to be off-road vehicles, which implies having to take into account the irregularities and especially the slope of the ground, in addition to the presence of debris or other objects on the ground surface.

Advantageously, the apparatus 1 herein provided, comprises opening means 40, 41, 42 destined to unfolding automatically each stabilizer 10 which is moved in the respective configuration of stabilization.

Such opening means 40, 41, 42 will be hereinafter described in the preferred embodiment thereof, with reference to the case wherein each stabilizer 10 is provided with a corresponding actuator 3 acting on the first arm 11 and suitable for alternately pushing it outwards or pulling it inwards the apparatus 1.

In this case, the actuator 3 is preferably interposed between the main body 2 and the first arm 11.

As shown schematically in the figures, in the preferred embodiment thereof, said opening means 40, 41, 42 include, for each stabilizer 10, a traction organ 40, 41, a first end of which is connected to the central body 2, preferably the side branch 21, while a second end is connected to the second arm 12.

The traction organ 40, 41 may comprise a flexible and inextensible element 40, which is preferably linear as a steel cable or a chain or the like.

The opening means 40, 41, 42 may then comprise, for each traction organ, at least one tension element 42 above which aforesaid flexible element 40 can slide.

The positioning of the tension element 42, which is intended to stretch appropriately the cable 40 (or any other similar element), as well as the length of the cable itself, are determined such that the flexible element 40 becomes stretched, thereby dragging the second arm 12 in rotation as a result of the outward thrust of the first arm 11.

In detail, the first arm 11 is pushed by the actuator 3 and caused to rotate downwards, while the second arm 12 is rotated upwards, thereby unfolding the stabilizer 10 which is brought into aforementioned extended position.

In other words, starting from the retracted position thereof, the actuator 3 is operated to push the first arm 11 outwards, thereby resulting in a tensioning of the cable 40 (or chain or the like), that simultaneously causes rotation of the second arm 12 with respect to the first one, i.e. it causes the above mentioned co-ordinated counter-rotating based on which the configuration of stabilization occurs.

As said, the length of the cable 40 and the position of the tension element 42 must be determined in such a manner that, upon a partial and not complete stroke by the actuator 3, the stabilizer 10 is already in the extended position thereof, which extended position is thus reached prior to its sticking to the ground.

By way of a non-limiting example, a tension element 42 is arranged relative to the rotoidal coupling between the branch 21 and the first arm 11, whilst a further tension element 42 can be disposed relative to the rotoidal coupling between the first and second arm 12.

The tension element 42 serves to tension the flexible element 40 and thus it can be provided with a stationary curved surface, for example cylindrical or otherwise axially symmetrical, or eventually rotatable, as in the case of a pulley, for the purpose of limiting the friction, or with a different configuration as long as suitable for the purpose.

As mentioned above, when the feet 13 of the stabilizers 10 are on the ground, the actuator 3 must push the stabilizer 10 by an extra-stroke such as to allow lifting and stabilization of the vehicle.

On the other hand, it is appropriate that the second arm 12 of the stabilizer 10 is already in the extended position thereof prior to touching the ground, and not loose about its rotoidal coupling, so that a vertical positioning thereof due to the force of gravity can be prevented, which may affect stability of the vehicle and result in a reduction of aforementioned support area.

Advantageously, in its preferred version, the invention comprises an elastic return means 41 fixed to said side branch 21 of the main body 2, relative to the first end of each flexible element 40.

Such elastic means 41, which only by way of example includes a spring, is configured such that, after the stabilizer 10 has rested its foot 13 onto the ground, the first arm 11 can continue rotating downwards as a result of aforesaid extra-stroke, despite the cable 40 (or the like) having been already stretched.

At the same time, the elastic means 41 is configured such that, when the stabilizer 10 is in its extended configuration prior to touching the ground, the second arm 12 remains in the position provided by this configuration, thus not coming to be arranged vertically and even less hanging down loosely.

Where the elastic means 41 is a spring, abovementioned aims are attained based on a suitable choice of the spring constant.

To ensure a correct return of the stabilizers 10 into the retracted position thereof and prevent the corresponding second arm 12 from oscillating as a pendulum in such position due to the side inertia, the invention may comprise closing means (not shown) for automatically folding each stabilizer 10 onto itself, which stabilizer 10 is thus moved into the retracted position thereof.

Such closing means may have a configuration which somehow corresponds to that of the opening means 40, 41, 42, done the due differences based on the different results to be attained.

Indeed, in addition to the cable or other traction organ of the type discussed above, which cable is connected to the second arm 12 at one end, and to the branch 21 at the opposite end, the closing means can further comprise, where possibly positionable, a return means, e.g. an elastic return means.

In addition, for each stabilizer 10, the closing means can include at least one tension element, below which tension element the cable can slide.

In this case, the tension element, which can structurally be like that of the opening means 40, 41, 42, is however positioned such that, as a result of the inwards dragging of the first arm 11 by the actuator 3, the cable comes to be stretched, thereby dragging downwards the second arm 12 in rotation, thus causing the stabilizer 10 to become folded onto itself, which stabilizer 10 is therefore brought into the repeatedly mentioned retracted position.

As previously mentioned, where the body is a box-shaped main body 2, the first arm 11 and the actuator 3 are movable between the two shaped plates thereof, which shaped plates are facing one another.

As visible from the figures, a generally triangular shape of the support foot 13 can be provided, exhibiting a truncated corner, relative to which the foot 13 is hinged.

In such a case, the foot 13 can be scalene triangle-shaped, wherein the barycentre is shifted towards the most internal acute angle, so that, following the dragging of the stabilizers 10 into the retracted position thereof, the corresponding foot 13 is caused to rotate automatically by the force of gravity, so that the abutment bottom destined for laying onto the ground, is raised substantially vertical, thereby being able to contain the side encumbrance within the limits already indicated above.

Further, thanks to the scalene triangle-shaped foot 13, when the stabilizer 10 is in the extended position thereof and comes into contact with the ground with the acute vertex of the foot 13, automatic rotation thereof occurs, so that the abutment bottom comes to be arranged parallel with the ground and in contact therewith.

As mentioned above, the handler the invention hereof refers to, can fit a stabilization system onto relevant vehicle comprising two apparatuses 1 as the one described above and provided relative to the front and rear side of the vehicle.

The system may further comprise a support bridge which is mountable longitudinally to the vehicle frame, at the ends of which the two apparatuses 1 are secured, thereby defining a functional unit; alternatively, the apparatuses 1 of the invention can be mounted directly onto the vehicle.

The invention claimed is:

1. A stabilization apparatus (1) for lifts, handlers and air platforms, comprising:
   at least one main body (2), adapted to be assembled onto a vehicle, equipped with at least two lateral branches (21), at which respective first arms (11) are rotoidally coupled, the latter being hinged at the proximal ends thereof to distal ends of the corresponding branches (21) and second arms (12), each rotoidally coupled to a respective first arm (11), defining, together with said branches (21), relative articulated stabilizers (10), wherein said stabilizers (10) are movable between a retracted position in which said stabilizers (10) are folded onto themselves, and an extended position wherein said stabilizers (10) are unfolded, thus defining a stabilization position;
   wherein the lateral branches (21) extend downwards;
   wherein, in the retracted position of each stabilizer (10), the respective first arm (11) and the respective second arm (12) are arranged above the relative branch (21) of the main body (2), one alongside the other, together defining a vertical encumbrance substantially determined by the length of the respective first arm (11),
   the main body (2) and the first and second arms (11, 12) being sized such that the vertical encumbrance of the apparatus (1) in its entirety is equal to said length of the respective first arms (11), when in the retracted position thereof, whereas the side encumbrance of the apparatus (1) is substantially equal to that of the main body (2).

2. The apparatus (1) according to claim 1, comprising actuating means (3) adapted to push the stabilizers (10) into said stabilization position.

3. The apparatus (1) according to claim 2, wherein said actuating means (3) include, for each stabilizer (10), an actuator (3) adapted alternatively to push outwards or pull inwards said first arm (11).

4. The apparatus (1) according to claim 1, comprising opening means (40, 41, 42) to automatically unfold each stabilizer (10) that is moved into the respective stabilization position.

5. The apparatus (1) according to claim 1, comprising closing means to automatically fold each stabilizer (10) onto itself which is moved into the respective retracted position.

6. A stabilization system for a vehicle of the type used in lifts, handlers or air platforms, comprising at least two apparatuses (1) according to claim 1, fixed to longitudinal ends of a support bridge.

7. A stabilization apparatus (1) for lifts, handlers and air platforms, comprising at least one main body (2), adapted to be assembled onto a vehicle, equipped with at least two lateral branches (21), at which respective first arms (11) are rotoidally coupled, characterised in that the apparatus (1) further comprises second arms (12), each rotoidally coupled to a respective first arm (11), defining, together with said branches (21), relative articulated stabilizers (10), wherein said stabilizers (10) are movable between a retracted position in which said stabilizers (10) are folded onto themselves, and an extended position wherein said stabilizers (10) are unfolded, thus defining a stabilization position, the apparatus further comprising, for each stabilizer (10), at least one traction organ (40, 41) comprising a first end connected to said main body and a second end connected to said second arm (12).

8. The apparatus (1) according to claim 7, wherein said traction organ comprises a flexible and inextensible element (40).

9. The apparatus (1) according to claim 8, comprising opening means (40, 41, 42) to automatically unfold each stabilizer (10) that is moved into the respective stabilization position, wherein said opening means (40, 41, 42) comprise for each stabilizer (10), at least one tension element (42) above which said flexible and inextensible element (40) can slide, to allow, following a thrust outwards of the first arm (11), the second arm (12) to be dragged in rotation upwards, hence unfolding the stabilizer (10) while the stabilizer (10) is brought into the aforementioned extended position.

10. The apparatus (1) according to claim 9, wherein a tension element (42) is arranged at the rotoidal coupling between the first arm (11) and the second arm (12).

11. The apparatus (1) according to claim 9, wherein a tension element (42) is arranged at the rotoidal coupling between said branch (21) and said first arm (11).

12. The apparatus (1) according to claim 8, comprising closing means to automatically fold each stabilizer (10) onto itself which is moved into the respective retracted position, wherein said closing means comprise, for each stabilizer (10), at least one tension element below which said flexible and inextensible element (40) can slide, to allow, following a thrust inwards of the first arm (11), the second arm (12) to be dragged in rotation downwards, hence folding the stabilizer (10) onto itself while the stabilizer (10) is brought into the aforementioned retracted position.

13. The apparatus (1) according to claim 12, wherein a tension element (42) is arranged at the rotoidal coupling between the first arm (11) and the second arm (12).

14. The apparatus (1) according to claim 7, wherein said traction organ (40, 41) includes, at said first end, an elastic return means (41) fixed to said branch (21).

* * * * *